United States Patent
Parker

(10) Patent No.: US 6,543,570 B2
(45) Date of Patent: Apr. 8, 2003

(54) ELECTRIC POWER ASSISTED STEERING SYSTEM WITH FRICTION COMPENSATION AND METHOD FOR CONTROLLING THE SYSTEM

(75) Inventor: Stuart W. Parker, Manhattan Beach, CA (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/898,562

(22) Filed: Jul. 3, 2001

(65) Prior Publication Data

US 2003/0006088 A1 Jan. 9, 2003

(51) Int. Cl.[7] .............................................. B62D 5/04
(52) U.S. Cl. ...................................... 180/446; 701/41
(58) Field of Search .......................... 180/443, 446; 701/36, 41

(56) References Cited

U.S. PATENT DOCUMENTS

| | | | |
|---|---|---|---|
| 4,660,671 A | * | 4/1987 | Behr et al. ................ 180/446 |
| 4,800,974 A | * | 1/1989 | Wand et al. .............. 180/446 |
| 4,951,198 A | | 8/1990 | Watanabe et al. |
| 5,904,223 A | | 5/1999 | Shimizu et al. |
| 6,131,054 A | | 1/2000 | Shibahata |
| 6,459,971 B1 | * | 10/2002 | Kurishige et al. ......... 701/41 |

OTHER PUBLICATIONS

The Control Handbook/editor William S. Levine, 1996, "Miscellaneous Mechanical Control Systems", pp. 1369–1382.

* cited by examiner

Primary Examiner—Lesley D. Morris
Assistant Examiner—Matthew Luby
(74) Attorney, Agent, or Firm—Tarolli, Sundheim, Covell & Tummino L.L.P.

(57) ABSTRACT

A steering gear (12) has a rack bar (36) and a housing (22). The rack bar (36) is movable linearly relative to the housing (22) for turning steerable wheels (68) of the vehicle. Movement of the rack bar (36) relative to the housing (22) is resisted by friction. An electric motor (14) is connected with the rack bar (36) and causes linear movement of the rack bar (36) relative to the housing (22). A controller (16), in response to a vehicle speed signal and a torsion signal, generates a motor control signal for controlling the electric motor (14). The controller (16) stores data indicative of the friction resisting movement of the rack bar (36) relative to the housing (22) of the steering gear (12). The controller (16) modifies the motor control signal to compensate for the friction.

6 Claims, 4 Drawing Sheets

ELECTRIC POWER ASSISTED STEERING SYSTEM WITH FRICTION COMPENSATION AND METHOD FOR CONTROLLING THE SYSTEM

TECHNICAL FIELD

The present invention relates to an electric power assisted steering system.

BACKGROUND OF THE INVENTION

Electric power assisted steering systems are well known in the art. Electric power assisted steering systems utilizing a rack and pinion steering gear provide power assistance by using an electric motor to either (i) apply rotary force to a steering input shaft connected to a pinion gear, or (ii) apply linear force to the rack bar of the rack and pinion steering gear.

In known electric power assisted steering systems, a controller controls the electric motor in responsive to (i) torsion across a torsion bar that is interposed between the steering wheel of the vehicle and a pinion gear and (ii) vehicle speed. Power assistance from the electric motor causes the rack bar of the steering gear to move linearly relative to the housing of the steering gear. Movement of the rack bar relative to the steering gear housing causes the steerable wheels of the vehicle to turn.

It is well known that friction resists the movement of the rack bar relative to the housing of the steering gear. The friction typically results from a sliding movement of the rack bar over parts of the steering gear, such as a bushing, a yoke assembly, and seals.

SUMMARY OF THE INVENTION

The present invention is an electric power assisted steering system for a vehicle. The electric power assisted steering system comprises a steering gear having a rack bar and a housing. The rack bar is movable linearly relative to the housing for turning steerable wheels of the vehicle. Movement of the rack bar relative to the housing is resisted by friction. An electric motor is connected with the rack bar of the steering gear. Energization of the electric motor causes linear movement of the rack bar relative to the steering gear housing. The electric power assisted steering system further includes a vehicle speed sensor for monitoring the speed of the vehicle and generating a signal indicative of the vehicle speed, a torsion sensor for monitoring the torsion across a torsion bar of the steering gear of the vehicle and generating a signal indicative of the torsion, and a controller for receiving the vehicle speed and torsion signals and, in response to the vehicle speed and torsion signals, for generating a motor control signal for controlling the electric motor. The controller stores data indicative of the friction resisting movement of the rack bar relative to the housing of the steering gear. The controller modifies the motor control signal to compensate for the friction.

The present invention also is a method for controlling an electric power assisted steering system for a vehicle. The electric power steering system includes a steering gear, an electric motor, and a controller for controlling the electric motor. The steering gear has a rack bar that is movable relative to a steering gear housing. Energization of the electric motor causes linear movement of the rack bar relative to the housing of the steering gear. Movement of the rack bar relative to the housing is resisted by friction. The method comprises the steps of (i) providing a vehicle speed signal indicative of a speed of the vehicle; (ii) providing a torsion signal indicative torsion across a torsion bar of the steering gear of the vehicle; (iii) generating a motor control signal in response to the torsion and vehicle speed signals; (iv) determining a value for the friction that resists movement of the rack bar relative to the housing of the steering gear; and (v) modifying the motor control signal to compensate for the friction.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
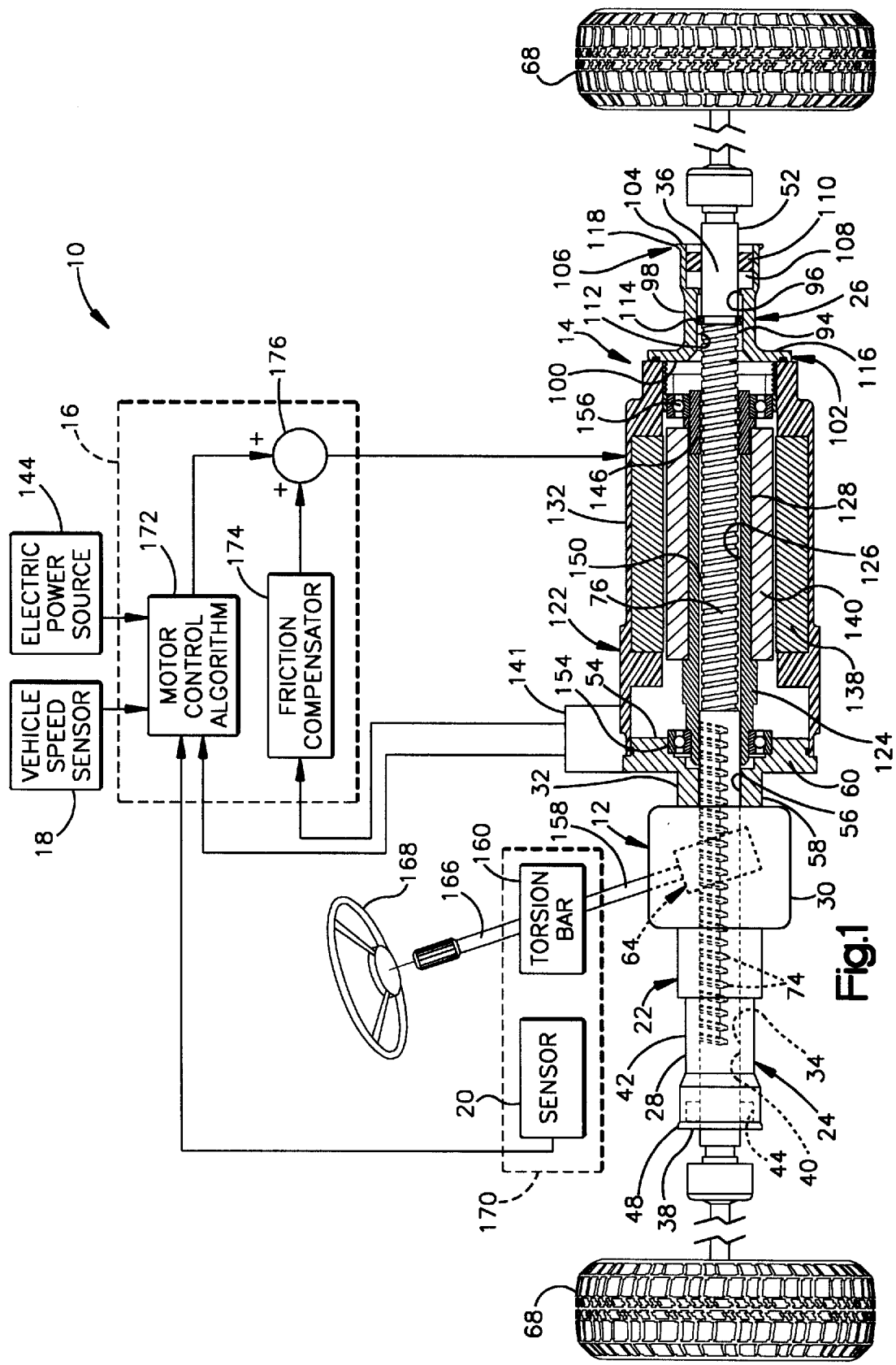
FIG. 1 is a schematic representation of an electric power assisted steering system constructed in accordance with the present invention.

FIG. 1 is a schematic representation of an electric power assisted steering system 10 constructed in accordance with the present invention. The electric power assisted steering system 10 includes a steering gear 12, an electric motor 14, a controller 16, and two sensors 18 and 20.

The steering gear 12 is a rack and pinion steering gear. As shown in FIG. 1, the rack and pinion steering gear 12 includes a housing 22. Preferably, the housing 22 is made of cast metal. The housing 22 includes a first housing part 24 and a second housing part 26. The first housing part 24 includes a first end portion 28, a central portion 30, and a second end portion 32. An axially extending passage 34 for receiving a portion of a rack bar 36 extends through the first housing part 24, including each portion 28, 30, and 32 of the first housing part 24.

The first end portion 28 of the first housing part 24 is tubular and terminates at a first end surface 38. The first end portion 28 includes an inner surface 40 and an outer surface 42. The inner surface 40 of the first end portion 28 defines a portion of the axially extending passage 34. Adjacent the first end surface 38, the inner surface 40 of the first end portion 28 includes an annular, radially outwardly extending seal recess 44 for receiving an annular seal. The outer surface 42 of the first end portion 28, adjacent the first end surface 38, includes a short radially outwardly extending lip 48 for supporting a portion of a boot.

An annular seal (not shown) is located in the seal recess 44 of the first end portion 28 of the first housing part 24. The seal has an inner diameter for engaging an outer surface 52 of the rack bar 36 for retaining fluid in the steering gear housing 22.

A boot (not shown) may be attached to the outer surface 42 of the first end portion 28 of the first housing part 24. The boot is held on the first end portion 28 of the first housing part 24 by the lip 48. The boot prevents dust, dirt, or any other foreign matter from entering the first housing part 24.

The second end portion 32 of the first housing part 24 is tubular and terminates at a second end surface 54. The second end surface 54 is axially opposite the first end surface 38 of the first end portion 28 of the first housing part 24. The second end portion 32 of the first housing part 24 includes an inner surface 56 and an outer surface 58. The inner surface 56 of the second end portion 32 defines a portion of the axially extending passage 34. The outer surface 58 includes an annular, radially outwardly extending flange 60 at the second end surface 54.

The central portion 30 of the first housing part 24 also includes a portion of the axially extending passage 34. Additionally, the central portion 30 includes a passage 62 (FIG. 2) for receiving a pinion gear 64. The pinion gear passage 62 extends into the first housing part 24 and tangentially intersects the axially extending passage 34. A yoke bore 66 also extends into the central portion 30 of the first housing part 24. The yoke bore 66 extends perpendicular to the axially extending passage 34 and connects with the axially extending passage 34 on a side of the axially extending passage 34 opposite from the pinion gear passage 62.

A portion of a rack bar 36 extends through the axially extending passage 34 of the first housing part 24. The rack bar 36 has opposite end portions that are connected to the steerable wheels 68 of the vehicle through tie rods. The rack bar 36 has a generally cylindrical main body 70. An upper surface 72 of the rack bar 36 has a plurality of teeth 74 (FIG. 1). A portion of the rack bar 36 adjacent the plurality of teeth 74 has a helical recess 76.

Figure 2:
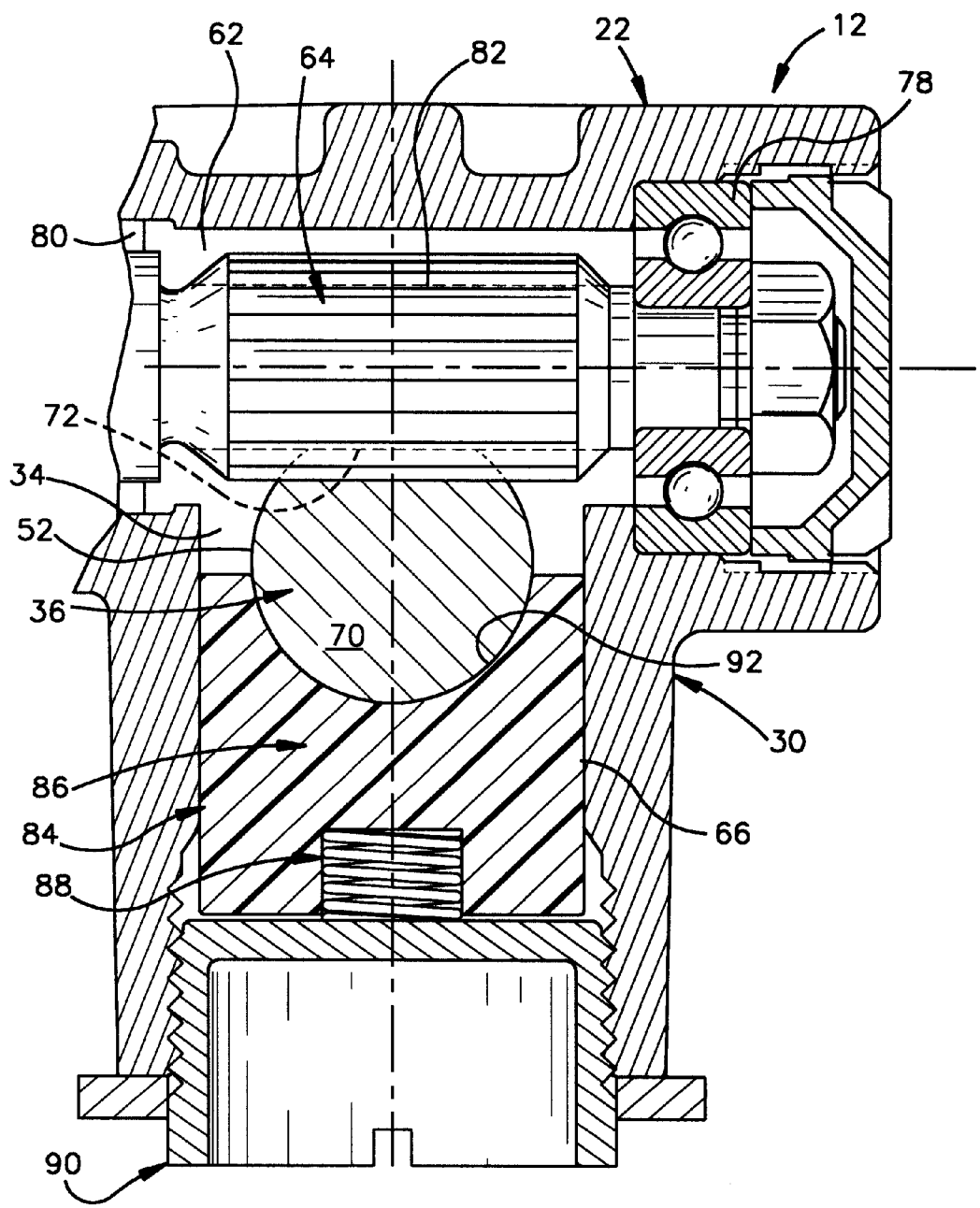
FIG. 2 is a perspective schematic view of a portion of the electric power assisted steering system of FIG. 1.

As shown in FIG. 2, a pinion gear 64 is located in the pinion passage 62 of the first housing part 24 (FIG. 1). Two bearing assemblies 78 and 80 rotatably support the pinion gear 64 in the first housing part 24. The first bearing assembly 78 is located at one end of the pinion gear 64. A second bearing assembly 80 is located at an opposite end of the pinion gear 64. The pinion gear 64 includes a plurality of teeth 82. The plurality of teeth 82 of the pinion gear 64 is disposed in meshing engagement with the plurality of teeth 74 (FIG. 1) of the rack bar 36, as shown in FIG. 2.

A yoke assembly 84 is located within the yoke bore 66 of the first housing part 24. The yoke assembly 84 supports and guides movement of the rack bar 36 relative to the first housing part 24. The yoke assembly 84 ensures that a proper lash exists between the teeth 82 of the pinion gear 64 and the teeth 74 of the rack bar 36.

The yoke assembly 84 includes a yoke 86, a spring 88, and a yoke plug 90 for closing the yoke bore 66. The yoke 86 includes an arcuate first surface 92 that contacts a portion of the rack bar 36. The yoke 86 is biased toward the rack bar 36 by the spring 88. The spring 88 is compressed between the yoke 86 and the yoke plug 90 and allows movement of the yoke 86 relative to the yoke plug 90 as the load on the rack bar 36 changes.

As shown in FIG. 1, the second housing part 26 is tubular and includes an axially extending passage 94 for receiving a portion of the rack bar 36. The axially extending passage 94 of the second housing part 26 is coaxial with the axially extending passage 34 of the first housing part 24. The second housing part 26 has an inner surface 96 and an outer surface 98. The inner surface 96 defines the axially extending passage 94 and extends from a first end surface 100 on a first end 102 of the second housing part 26 to a second end surface 104 on a second end 106 of the second housing part 26. The inner surface 96 of the second housing part 26 includes an annular, radially outwardly extending seal recess 108 adjacent the second end surface 104 for receiving a seal 110. The inner surface 96 also includes a bushing recess 112, axially adjacent the seal recess for receiving a bushing 114.

The outer surface 98 of the second housing part 26 includes an annular, radially outwardly extending flange 116 at the first end surface 100. Adjacent the second end surface 104, the outer surface 98 includes a short radially outwardly extending lip 118 for receiving a boot.

A cylindrical bushing 114 is located in the bushing recess 112 of the second housing part 26. The bushing 114 supports the rack bar 36 for movement relative to the second housing part 26.

An annular seal 110 is located in the seal recess 108 in the second housing part 26. The seal 110 has an inner diameter for engaging an outer surface 52 of the rack bar 36 for retaining fluid in the steering gear housing 22.

A boot (not shown) is attached to the outer surface 98 of the second end 106 of the second housing part 26. The boot is held on the second end 106 of the second housing part 26 by the lip 118. The boot prevents dust, dirt, or any other foreign matter from entering the second housing part 26.

As illustrated in FIG. 1, the electric motor 14 includes a housing 122 that is interposed between the first housing part 24 and the second housing part 26 of the steering gear housing 22. The electric motor housing 122 includes a cylindrical motor housing member 132 that extends axially between the flange 60 of the first housing part 24 and the flange 116 of the second housing part 26. The motor housing member 132 encloses a stator 138 and a rotor 140 of the electric motor 14.

The stator 138 of the electric motor 14 is fixed to an inner surface 142 of the motor housing member 132. The stator 138 includes a plurality of stator poles (not shown), each surrounded by a winding (not shown). The rotor 140 is rotatably mounted within the stator 138. The rotor 140 is coaxial with the stator 138 and includes a plurality of rotor poles (not shown). The electric motor 14 is of a conventional design and is connected with an electric power source 144. When stator poles in the stator 138 are energized, the rotor 140 is caused to rotate relative to the stator 138 and the motor housing member 132.

The electric motor 14 also includes a motor position sensor 141. The motor position signal 141 monitors the position of the rotor 140 relative to the stator 138.

The electric motor 14 further includes an axially extending output shaft 124. The output shaft 124 of the electric motor 14 is connected to the rotor 140 and includes an inner surface 126 and an outer surface 128. An inner surface 126 of the output shaft 124 of the electric motor 14 defines an axially extending passage 150 through which the portion of the rack bar 36 having the helical recess 76 passes. The axially extending passage 150 of the output shaft 124 is coaxial with the axially extending passages 34 and 94 of the first and second housing parts 24 and 26. The outer surface 128 of the output shaft 124 is connected to the flange 60 of the first housing part 24 and the flange 116 of the second housing part 26 with a first and second bearing 154 and 156, respectively.

An end of the output shaft 124 of the electric motor 14 is connected with a ballnut 146. The ballnut 146 interacts with the helical recess 76 on the rack bar 36 to translate the rotation of the rotor 140 into linear movement of the rack bar 36. As the rotor 140 rotates in a first direction, the ballnut 146 causes the rack bar 36 to move to the right as viewed in FIG. 1. As the rotor 140 of the electric motor 14 rotates in a second direction, opposite the first direction, the ballnut 146 causes the rack bar 36 to move to the left, as viewed in FIG. 1.

With reference to FIG. 1, an output shaft 158 connects the pinion gear 64 with a bottom end of a torsion bar 160 shown schematically. An input shaft 166 connects an upper end of the torsion bar 160 with the steering wheel 168 of the vehicle. The torsion bar 160 is configured to twist when a torque of a predetermined magnitude is applied across the torsion bar 160. Thus, if the vehicle driver turns the steering wheel 168 and there is little resistance to the turning of the steerable wheels 68, the torsion bar 160 will not twist and the output shaft 158 will rotate with the rotation of the input shaft 166. As a result, the pinion gear 64 will rotate causing the rack bar 36 to move linearly to turn the steerable wheels 68 of the vehicle. If there is sufficient resistance to the turning of the steerable wheels 68, a torque greater than the predetermined magnitude will be applied across the torsion bar 160. As a result, the input shaft 166 will rotate relative to the output shaft 158, twisting the torsion bar 160.

As shown in FIG. 1, the electric power assisted steering system 10 also includes a torsion sensor 20 that is operatively connected across the input shaft 166 and the output shaft 158, as shown schematically at 170. The torsion sensor 20 senses the rotation of the input shaft 166 relative to the output shaft 158 and generates a signal indicative of the relative rotation. This relative rotation is the torsion across the torsion bar 160.

The electric power assisted steering system 10 further includes a vehicle speed sensor 18. The vehicle speed sensor 18 senses the speed of the vehicle and generates a signal indicative of the vehicle speed.

The controller 16 is electrically connected with the torsion sensor 20 and the vehicle speed sensor 18 and receives the signals generated by the sensors 18 and 20. The controller 16 preferably includes a microprocessor. The controller 16 runs a known algorithm, represented schematically at 172, and, in response to the torsion signal and the vehicle speed signal, generates a motor control signal for controlling the electric motor 14 for providing power assistance to the turning of the steerable wheels 68 of the vehicle. The motor control signal includes both a direction of rotation for the electric motor 14 and a motor current for generating a desired motor torque.

As shown in FIG. 1, the controller 16 also includes a friction compensator 174. The friction compensator 174 determines the frictional forces opposing movement of the rack bar 36 in the steering gear 12 and generates a friction compensation signal to compensate for the frictional forces. The most prevalent frictional forces opposing movement of the rack bar 36 arise from the sliding of the rack bar 36 relative to the bushing 114, the yoke assembly 84, and the seal 110 of the steering gear 12.

The friction compensator 174 compensates only for the kinetic friction, and does not compensate for static friction. The friction compensator 174 assumes that (1) the coefficient of kinetic friction, $\mu_k$, between the rack bar 36 and the respective parts of the steering gear 12 is constant and is not varied over the life of the steering gear 12; and (2) the value of the coefficient of kinetic friction, $\mu_k$, is dependent only on the direction of movement of the rack bar 36 relative to the respective parts of the steering gear 12 and is not dependent upon rack bar 36 velocity.

Preferably, the friction compensator 174 includes a look-up table stored in the controller 16. The look-up table includes data indicative of the kinetic friction in the steering gear 12 for a given direction of rack bar 36 movement relative to the respective parts of the steering gear 12. The data for the look-up table may be obtained by testing a steering gear 12 of like construction. The direction of rack movement is determined by calculating the derivative of the motor position signal generated by the motor position sensor 141. The derivative of the motor position signal is a motor velocity signal. The motor velocity signal has a direction and a magnitude. The direction of the motor velocity signal indicates the direction of movement of the rack bar 36. Alternatively, the direction of rack bar movement may be measured by tracking the position or velocity of the rack bar.

Given the direction of movement of the rack bar 36, reference to the look-up table will indicate a value for the friction losses. After reference to the look-up table, the friction compensator 174 generates a friction compensation signal. The friction compensation signal is indicative of a motor torque necessary to compensate for the frictional forces opposing movement of the rack bar 36.

The controller 16 further includes a summing junction 176. The summing junction 176 adds the friction compensation signal to the motor control signal. An output signal from the summing junction 176 is sent to the electric motor 14 for controlling the electric motor 14. As a result of the friction compensation signal, the torque generated by the electric motor 14 is increased to compensate for the friction.

The electric power assisted steering system 10 having friction compensation improves the returnability of the steering gear 12 when the electric motor 14 is energized to return the rack bar 36 to a straight-ahead position. Returnability is the tendency of the rack bar 36 to return to a straight-ahead position, i.e., zero steering angle, following a steering maneuver. Returnability is improved because the friction compensation overcomes the frictional forces that tend to stop the return of the rack bar 36 prior to reaching the straight-ahead position.

Figure 3:
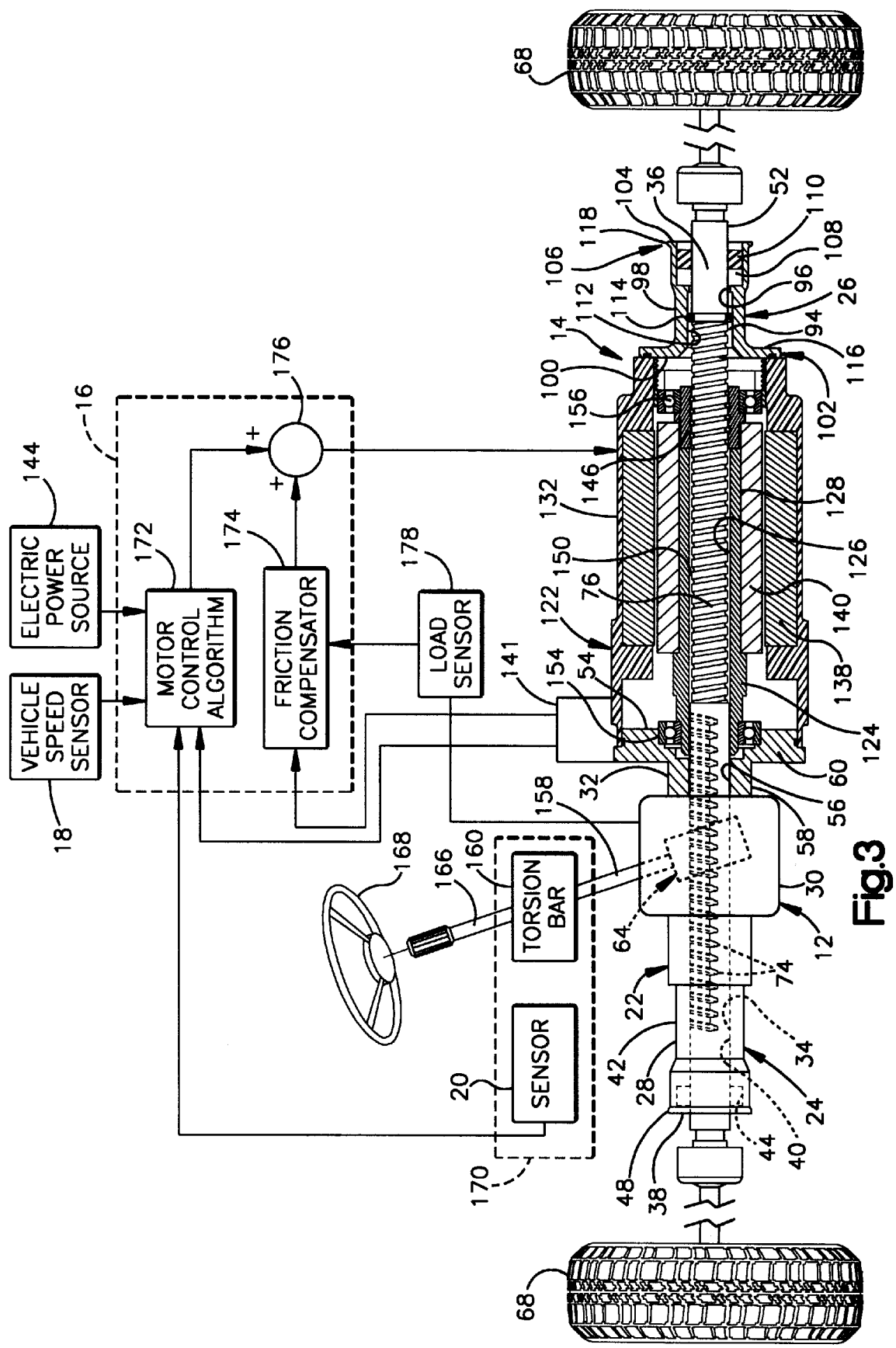
FIG. 3 is a schematic representation of a second embodiment of an electric power assisted steering system constructed in accordance with the present invention.

A second embodiment of an electric power assisted steering system 10 constructed in accordance with the present invention is illustrated in FIG. 3. The second embodiment is similar to the first embodiment and thus, the same reference numbers will be used to represent the similar structure.

Figure 4:
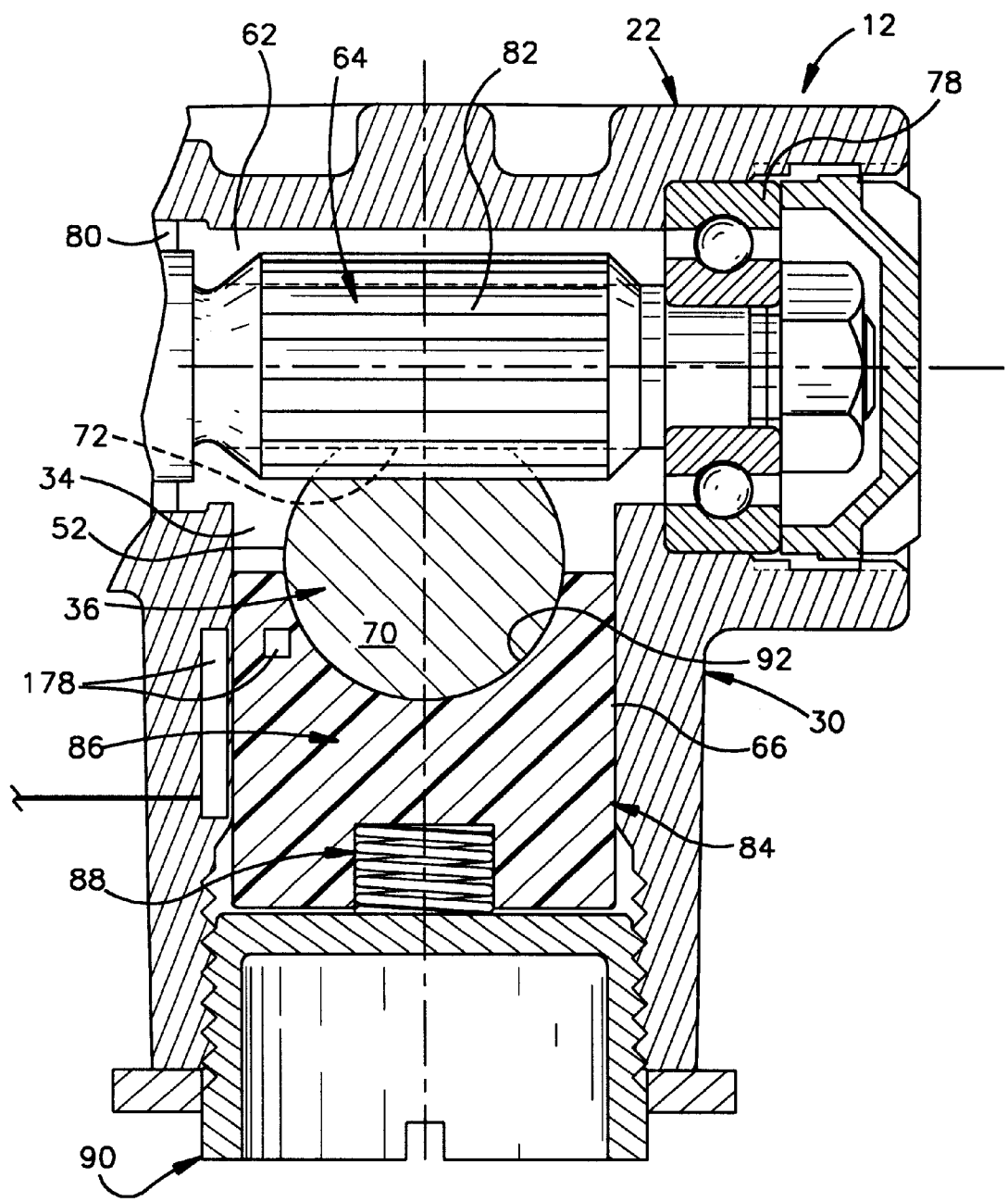
FIG. 4 is a cross-section view of a portion of a steering gear of the electric power assisted steering system of FIG. 4.

The second embodiment includes a rack load sensor 178. As shown in FIG. 4, the rack load sensor 178 monitors the yoke assembly 84 to determine the load on the rack bar 36. The yoke 86 of the yoke assembly 84 moves relative to the yoke plug 90 as a function of the load of the rack bar 36. The spring 88 of the yoke assembly 84 has a known rate of compression. Thus, the amount of movement of the yoke 86 relative to the yoke plug 90 can be used to determine the load applied to the yoke assembly 84 by the rack bar 36. As shown in FIG. 4, the rack load sensor 178 is located in the yoke bore 66 of the central portion 30 of the first housing part 24. The rack load sensor 178 monitors the movement of the yoke 86 relative to the yoke plug 90, and based on the movement generates a signal indicative of the load of the rack bar 36.

The rack load sensor 178 is electrically connected to the controller 16. The load signal is input into the friction compensator 174. The friction compensator 174 includes a look-up table that stores values for the friction that are dependent upon the direction of the rack bar 36 movement and the load on the rack bar 36. The data for the look-up table may be obtained by testing a steering gear 12 of like construction.

The friction compensator 174 generates a friction compensation signal indicative of a torque necessary to overcome the frictional forces opposing movement of the rack bar 36. A summing junction 176 adds the friction compensation signal to the motor control signal. An output signal is sent from the summing junction 176 to the electric motor 14 for controlling the electric motor 14. Friction compensation that is dependent upon both the direction of the rack bar 36 movement and the rack bar 36 load further improves the returnability of the electric power assisted steering system 10.

From the above description of the invention, those skilled in the art will perceive improvements, changes and modifications. Such improvements, changes and modifications within the skill of the art are intended to be covered by the appended claims.

Having described the invention, the following is claimed:

1. An electric power assisted steering system for a vehicle, the electric power assisted steering system comprising:

a steering gear having a rack bar and a housing, the rack bar being movable linearly relative to the housing for turning steerable wheels of the vehicle, movement of the rack bar being resisted by friction;

an electric motor being connected with the rack bar of the steering gear, energization of the electric motor causing linear movement of the rack bar relative to the housing;

a vehicle speed sensor for monitoring speed of the vehicle and generating a signal indicative of the vehicle speed;

a torsion sensor for monitoring torsion across a torsion bar of the steering gear and generating a signal indicative of the torsion; and a controller for receiving the vehicle speed and torsion signals and, in response to the received signals, for generating a motor control signal for controlling the electric motor, the controller storing data indicative of the friction resisting movement of the rack bar relative to the housing of the steering gear, the controller modifying the motor control signal to compensate for the friction.

2. The system of claim 1 further being defined by:

the controller storing a look-up table having values for the friction that are dependent upon a direction of movement of the rack bar relative to the housing of the steering gear.

3. The system of claim 2 further including:

a motor position sensor for sensing the position of the motor and generating a motor position signal, a derivative of the motor position signal being a motor velocity signal, the direction of movement of the rack bar relative to the housing of the steering gear being determined by the motor velocity signal.

4. A method for controlling an electric power assisted steering system for a vehicle, the electric power assisted steering system including a steering gear, an electric motor, and a controller for controlling the electric motor, the steering gear having a rack bar that is movable relative to a steering gear housing, rotation of the electric motor causing linear movement of the rack bar of the steering gear relative to the housing of the steering gear, movement of the rack bar relative to the housing being resisted by friction, the method comprising the steps of:

providing a vehicle speed signal indicative of a speed of the vehicle;

providing a torsion signal indicative of torsion across a torsion bar of the steering gear of the vehicle;

generating a motor control signal in response to the torsion and vehicle speed signals;

determining a value for the friction that resists movement of the rack bar relative to the housing of the steering gear; and modifying the motor control signal to compensate for the friction.

5. The method of claim 4, the step of determining a value for the friction that resists movement of the rack bar relative to the housing of the steering gear further being defined by the steps of:

determining a direction of movement of the rack bar relative to the housing; and accessing a look-up table having values for the friction dependent upon the direction of movement of the rack bar relative to the housing.

6. The method of claim 5, the step of determining a direction of movement of the rack bar relative to the housing further including the steps of:

generating a motor position signal; and generating a motor velocity signal by taking a derivative of the motor position signal;

determining direction of movement of the rack bar directly by determining the sign of the motor velocity signal.

* * * * *